United States Patent
Wu

(10) Patent No.: US 11,762,983 B2
(45) Date of Patent: Sep. 19, 2023

(54) PAYMENT APPLICATION ISOLATION METHOD AND APPARATUS, AND TERMINAL

(71) Applicant: Huawei Technologies Co., Ltd., Shenzhen (CN)

(72) Inventor: Bo Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1155 days.

(21) Appl. No.: 16/347,126

(22) PCT Filed: Dec. 30, 2016

(86) PCT No.: PCT/CN2016/113961
§ 371 (c)(1),
(2) Date: Dec. 3, 2019

(87) PCT Pub. No.: WO2018/082189
PCT Pub. Date: May 11, 2018

(65) Prior Publication Data
US 2020/0175153 A1    Jun. 4, 2020

(30) Foreign Application Priority Data
Nov. 3, 2016   (CN) .......................... 201610953093.9

(51) Int. Cl.
*G06F 21/53* (2013.01)
*G06F 21/55* (2013.01)
(Continued)

(52) U.S. Cl.
CPC ............ *G06F 21/53* (2013.01); *G06F 21/554* (2013.01); *G06Q 20/3672* (2013.01);
(Continued)

(58) Field of Classification Search
CPC ................... G06F 21/53; G06F 21/554; G06F 2221/033; G06F 2221/2149; G06F 21/74;
(Continued)

(56) References Cited

U.S. PATENT DOCUMENTS 8,649,770 B1 *  2/2014  Cope ................... G06F 21/6245
                                                          370/231
9,317,689 B2 *  4/2016  Aissi ....................... G06F 21/57
(Continued)

FOREIGN PATENT DOCUMENTS

CN         101753545 A      6/2010
CN         104036202 A      9/2014
(Continued)

OTHER PUBLICATIONS

Bo, Y., et al., "Secure Access Scheme of Cloud Services for Trusted Mobile Terminals using TrustZone," Journal of Software, 2016, Issue 06, 18 pages.
(Continued)

*Primary Examiner* — Christopher C Harris
(74) *Attorney, Agent, or Firm* — Conley Rose, P.C.

(57) ABSTRACT

A payment application isolation method and apparatus, and a terminal are provided. In the payment application isolation method, a payment application that is selected by a user and that is to be added to an isolation area is obtained; and if the to-be-added payment application has an attribute of being addable to a first isolation area, the to-be-added payment application is added to the first isolation area; or if the to-be-added payment application has an attribute of being addable to a second isolation area, the to-be-added payment application is added to the second isolation area. A payment application added to the first isolation area has an attribute of being invocable by a trusted application installed outside the first isolation area, and a payment application added to
(Continued)

the second isolation area has an attribute of being completely isolated from an application installed outside the second isolation area.

20 Claims, 13 Drawing Sheets

(51) Int. Cl.
*G06Q 20/36* (2012.01)
*G06Q 30/018* (2023.01)
*G06Q 30/02* (2023.01)

(52) U.S. Cl.
CPC ..... *G06Q 30/0185* (2013.01); *G06Q 30/0281* (2013.01); *G06F 2221/033* (2013.01); *G06F 2221/2149* (2013.01)

(58) Field of Classification Search
CPC ................ G06F 21/57; G06Q 20/3672; G06Q 30/0185; G06Q 30/0281; G06Q 20/382
See application file for complete search history.

(56) References Cited

U.S. PATENT DOCUMENTS

| | | | |
|---|---|---|---|
| 2010/0138896 | A1 | 6/2010 | Atsushi |
| 2013/0060959 | A1 | 3/2013 | Taveau et al. |
| 2014/0157363 | A1 | 6/2014 | Banerjee |
| 2014/0245013 | A1* | 8/2014 | Kim ........................ H04L 67/34 726/4 |
| 2015/0348026 | A1* | 12/2015 | Roberts .............. G06Q 20/3827 705/44 |
| 2016/0196432 | A1 | 7/2016 | Main et al. |
| 2016/0381026 | A1* | 12/2016 | Silva Pinto ........... H04W 12/08 726/4 |
| 2017/0011396 | A1* | 1/2017 | Desai ..................... G06Q 20/08 |

FOREIGN PATENT DOCUMENTS

| | | |
|---|---|---|
| CN | 104125216 A | 10/2014 |
| CN | 104657683 A | 5/2015 |
| CN | 104809413 A | 7/2015 |
| CN | 104850768 A | 8/2015 |
| CN | 105205370 A | 12/2015 |
| CN | 105830477 A | 8/2016 |
| JP | 2014112392 A | 6/2014 |
| JP | 2015011498 A | 1/2015 |
| WO | 2008126773 A1 | 10/2008 |
| WO | 2015150689 A1 | 10/2015 |
| WO | 2015197000 A1 | 12/2015 |
| WO | 2016061118 A1 | 4/2016 |

OTHER PUBLICATIONS

Choi, J., et al., "Isolated Mini-domain for Trusted Cloud Computing," 13th IEEE/ACM International Symposium on Cluster, Cloud, and Grid Computing, Jun. 25, 2013, 2 pages.
Zheng, X., et al., "TrustPAY: Trusted Mobile Payment on Security Enhanced ARM TrustZone Platforms," XP032946295, IEEE Symposium on Computers and Communication (ISCC), 2016, 7 pages.
Foreign Communication From a Counterpart Application, European Application No. 16920819.6, Extended European Search Report dated Sep. 10, 2019, 8 pages.
Machine Translation and Abstract of Chinese Publication No. CN104125216, Oct. 29, 2014, 25 pages.
Machine Translation and Abstract of Chinese Publication No. CN105830477, Aug. 3, 2016, 36 pages.
Foreign Communication From a Counterpart Application, Chinese Application No. 201680057108.1, Chinese Office Action dated Oct. 8, 2019, 10 pages.
Machine Translation and Abstract of Chinese Publication No. CN104657683, May 27, 2015, 13 pages.
Machine Translation and Abstract of Chinese Publication No. CN101753545, Jun. 23, 2010, 16 pages.
Machine Translation and Abstract of Chinese Publication No. CN104036202, Sep. 10, 2014, 19 pages.
Machine Translation and Abstract of Chinese Publication No. CN104809413, Jul. 29, 2015, 9 pages.
Machine Translation and Abstract of Chinese Publication No. CN104850768, Aug. 19, 2015, 18 pages.
Machine Translation and Abstract of Chinese Publication No. CN105205370, Dec. 30, 2015, 21 pages.
Machine Translation and Abstract of International Publication No. WO2015150689, Oct. 8, 2015, 13 pages.
Foreign Communication From a Counterpart Application, PCT Application No. PCT/CN2016/113961, English Translation of International Search Report dated Aug. 9, 2017, 2 pages.
Foreign Communication From a Counterpart Application, PCT Application No. PCT/CN2016/113961, English Translation of Written Opinion dated Aug. 9, 2017, 4 pages.

* cited by examiner

CMCC

✕  Add genuine applications (0/120)  ✓

Search for a genuine application

Payment zone

E-Bank
21.2 M
E-Bank, your butler                                Download

City Bank
21.2 M
City Bank, your butler                             Download

Postal Savings Bank of China
21.2 M
City Bank, your butler                             Download HK Bank
21.2 M
City Bank, your butler                             Download SPDB
21.2 M
City Bank, your butler                             Download

PAYMENT APPLICATION ISOLATION METHOD AND APPARATUS, AND TERMINAL

This application claims priority to Patent Application No. 201610953093.9, filed on Nov. 3, 2016 and entitled "METHOD AND DEVICE FOR PROTECTING PAYMENT APPLICATION ON MOBILE TERMINAL", which is incorporated herein by reference in its entirety.

TECHNICAL FIELD

This application relates to the field of communications technologies, and in particular, to a payment application isolation method and apparatus, and a terminal.

BACKGROUND

With the development of communications technologies, increasingly powerful functions can be implemented by a terminal, and can be used in more diversified scopes and environments. For example, it becomes increasingly popular that various financial payment applications are currently used in the terminal to implement mobile payment.

A payment application is used in a terminal to implement a mobile payment function. This facilitates financial payment of a user, but has a risk that assets may be stolen. For example, an unknown malicious application for stealing assets can steal user assets by accessing a financial payment application installed on a terminal. Currently, use security of a payment application installed on a terminal is enhanced to prevent user assets from being stolen. Usually, the payment application is installed in an independent space. The payment application in the independent space is completely isolated from an application outside the independent space, so that an unknown malicious application for stealing the assets that is outside the space cannot access the financial payment application in the independent space.

However, the payment application installed on the terminal is inevitably invoked by some common applications installed on the terminal. Payment applications invoked by the common applications are usually applications used frequently by a user. If these frequently used applications are installed inside the independent space, great inconvenience is brought to use by the user.

SUMMARY

Embodiments of this application provide a payment application isolation method and apparatus, and a terminal, to allow a user to use a payment application conveniently while ensuring use security of the payment application.

According to a first aspect, a payment application isolation method is provided. A terminal obtains a payment application that is selected by a user and that is to be added to an isolation area; and if the to-be-added payment application has an attribute of being addable to a first isolation area, adds the to-be-added payment application to the first isolation area; or if the to-be-added payment application has an attribute of being addable to a second isolation area, adds the to-be-added payment application to the second isolation area. A payment application added to the first isolation area has an attribute of being invocable by a trusted application installed outside the first isolation area, and a payment application added to the second isolation area has an attribute of being completely isolated from an application installed outside the second isolation area, and cannot be invoked by any other application.

In this embodiment of this application, the payment application to be added the isolation area is added to a corresponding isolation area according to an attribute of being addable to the first isolation area or the second isolation area. The payment application invocable by the trusted application installed outside the first isolation area is added to the first isolation area, to facilitate invoking by the trusted application while providing security protection. The payment application that is completely isolated from the application installed outside the second isolation area is added to the second isolation area, to provide security protection of a high security level. The foregoing method allows a user to use a payment application conveniently while ensuring payment application security.

The payment application added to the first isolation area may be a payment wallet application, and the payment application added to the second isolation area may be a financial asset application.

In a possible design, a payment zone is pre-created. The pre-created payment zone includes payment applications to be added to the first isolation area and the second isolation area. After obtaining the payment application that is selected by the user and that is to be added to the isolation area, the terminal determines that a payment application that is the same as the to-be-added payment application exists in the payment zone, so as to determine attribute information that the to-be-added payment application is addable to the first isolation area or the second isolation area.

In another possible design, the first isolation area and the second isolation area are created in different terminal users. For example, the first isolation area is installed in a primary terminal user, the second isolation area is installed in a subordinate terminal user, and the subordinate terminal user in which the second isolation area is installed is set as a hidden user, to further improve security.

In still another possible design, after the payment application to be added to the second isolation area is added to the subordinate terminal user, an unnecessary process of the subordinate terminal user in which the second isolation area is created may be deleted. Deleting the unnecessary process can ensure security and reduce resource and memory consumption.

In still another possible design, after the payment application to be added to the first isolation area is added to the primary terminal user, the payment application added to the first isolation area is displayed in a display interface of the primary terminal user in a display manner different from that of a common application, so that a user can determine a payment application on which security protection is performed.

In still another possible design, after the to-be-added payment application is added to the first isolation area, if it is detected that an unknown malicious program is accessing the payment application added to the first isolation area, access performed by the unknown malicious program is blocked, and prompt information is displayed, where the prompt information is used to inform that there is an unknown malicious program.

According to a second aspect, a payment application isolation apparatus is provided, where the payment application isolation apparatus has functions of implementing the payment application isolation method in the first aspect. The functions may be implemented by using hardware, or may be implemented by executing corresponding software by hardware. The hardware or the software includes one or more modules corresponding to the foregoing functions.

In a possible design, the payment application isolation apparatus includes an obtaining unit and a processing unit. Functions of the obtaining unit and the processing unit may correspond to steps in the method, and details are not repeated herein.

According to a third aspect, a terminal is provided, where the terminal includes a processor, a memory, a display device, and an input device; the input device, the display device, and the memory may be connected to the processor by using a bus; and the memory is configured to store program code executed by the processor. A user selects, by using the input device, a payment application to be added on the terminal. The processor is configured to invoke the program code stored in the memory, to obtain, by using the input device, a payment application that is selected by a user and that is to be added to an isolation area; control the display device to display an application icon of the payment application, and implement any payment application isolation method in the first aspect. The display device is configured to display the payment application under control of the processor.

According to the payment application isolation method and apparatus, and the terminal that are provided in the embodiments of this application, the payment application invocable by the trusted application installed outside the first isolation area is added to the first isolation area, to facilitate invoking by the trusted application while providing security protection. The payment application that is completely isolated from the application installed outside the second isolation area is added to the second isolation area, to provide security protection of a high security level. The foregoing method allows a user to use a payment application conveniently while ensuring payment application security.

DESCRIPTION OF EMBODIMENTS

A payment application isolation method provided in the embodiments of this application may be applied to a terminal. It should be noted that the terminal in the embodiments of this application may also be referred to as a mobile terminal (Mobile Terminal), a mobile station (Mobile Station, Miss.), user equipment (User Equipment, UE), or the like. The terminal may be a device that provides voice and/or data connectivity for a user, a handheld device having a wireless connection function, or another processing device connected to a wireless modem. For example, the terminal may be a mobile phone (or referred to as a "cellular" phone) or a computer having a mobile terminal; or may be a portable, pocket-sized, handheld, computer built-in, or in-vehicle mobile apparatus; or certainly may be a wearable device (for example, a smartwatch or a smart band), a tablet computer, a personal computer (Personal Computer, PC), a personal digital assistant (Personal Digital Assistant, PDA), a POS (point of sales, Point of Sales), or the like.

Figure 1:
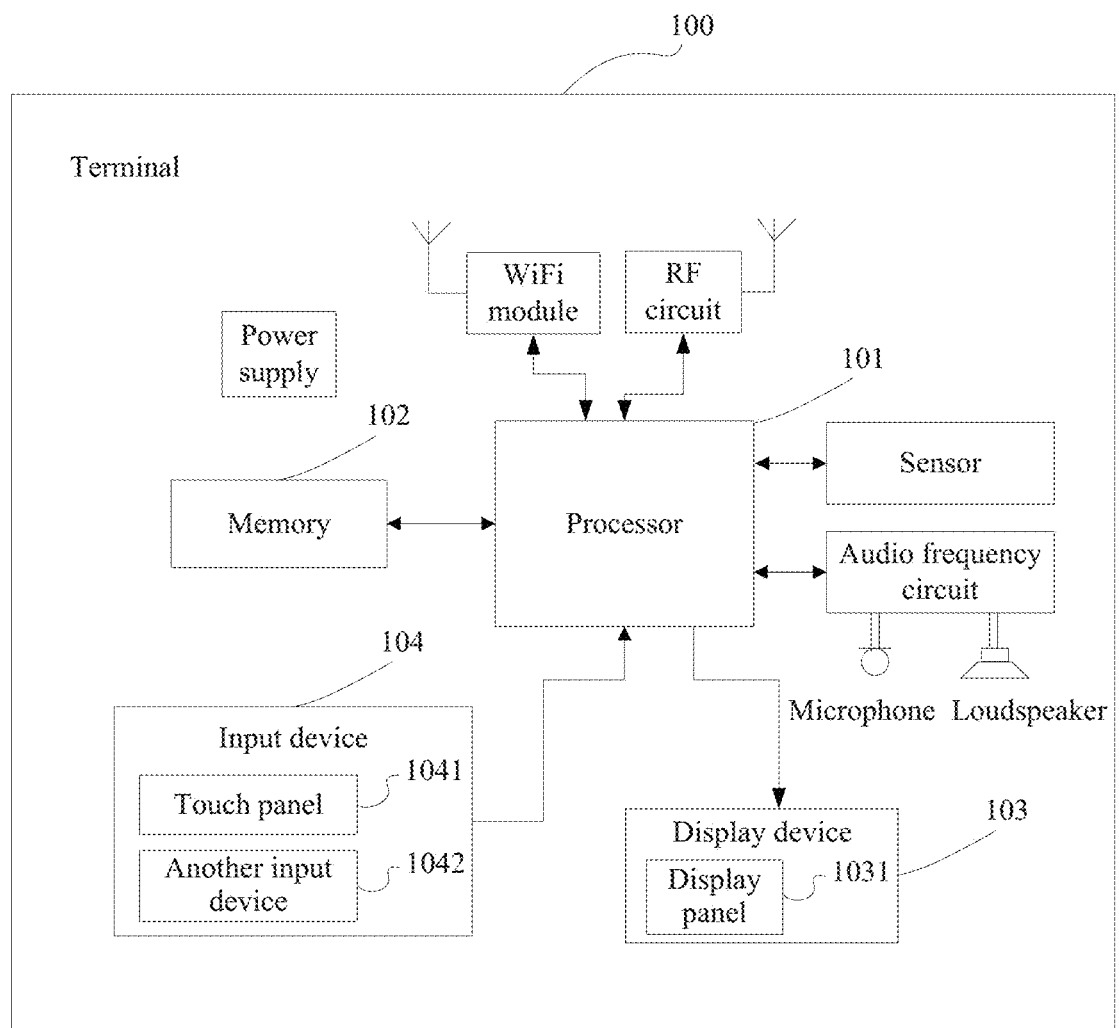
FIG. 1 is a schematic structural diagram of a terminal according to an embodiment of this application.

FIG. 1 is a schematic diagram of an optional hardware structure of a terminal 100 in an embodiment of this application.

As shown in FIG. 1, an interior of the terminal 100 may include a processor 101 and a memory 102, a display device 103, and an input device 104 that are separately connected to the processor 101. The memory 102 may be configured to store a program and data, including a program of a payment application in the embodiments of this application. The processor 101 runs the program stored in the memory 102 to perform function applications of the terminal 100 and data processing, for example, a payment application isolation function of the terminal 100.

The following describes the constituent components of the terminal 100 in detail with reference to FIG. 1.

The processor 101 is a control center of the terminal 100, and is connected to all components of the entire terminal by using various interfaces and lines. By running or executing the program (or referred to as a "module") stored in the memory 102 and invoking data stored in the memory 102, the processor 101 performs the functions of the terminal 100 and processes data, so as to perform overall monitoring on the terminal 100.

Optionally, the processor 101 may include at least one processing unit. Optionally, the processor 101 may be integrated with an application processor and a modem processor. The application processor primarily processes an operating system, a user interface, an application program, and the like, and the modem processor primarily processes radio communication. It can be understood that the modem processor may alternatively be not integrated in the processor 101.

The memory 102 mainly includes a program storage area and a data storage area. The program storage area may store an operating system (for example, an Android operating system, "Android system" for short, where the operating system may also be referred to as a "system"), an application program required by at least one function (for example, a sound playback function or an image playback function), a program of at least one payment application in the embodiments of this application, and the like. The data storage area may store data created based on usage of the terminal 100, including related setting information, usage information, or the like of the payment application in the embodiments of this application. In addition, the memory 102 may include a high-speed random access memory, and may further include a non-volatile memory such as at least one disk storage device, a flash memory device, or another volatile solid-state storage device.

The input device 104 may be configured to: receive input digits or character information, and generate an input instruction of key signal input related to user setting and function control of the terminal 100, including an input instruction of selecting, by a user, a payment application to be added to a terminal in the embodiments of this application. Specifically, the input device 104 may include a touch panel 1041 and another input device 1042. The touch panel 1041, also referred to as a touchscreen, may collect a touch operation performed by a user on or near the touch panel 1041 (for example, an operation performed on or near the touch panel 1041 by the user by using a finger, a stylus, or any other proper object or accessory), and drives a corresponding connection apparatus according to a preset program. Optionally, the touch panel 1041 may include two components: a touch detection apparatus and a touch controller. The touch detection apparatus detects a touch location of a user, detects a signal brought by a touch operation, and transfers the signal to the touch controller. The touch controller receives touch information from the touch detection apparatus, converts the touch information into touch point coordinates, and sends the touch point coordinates to the processor 101, and can receive and execute a command sent by the processor 101. In addition, the touch panel 1041 may be implemented in a plurality of types such as a resistive type, a capacitive type, an infrared type, and a surface acoustic wave type. In addition to the touch panel 1041, the input device 104 may further include the another input device 1042. Specifically, the another input device 1042 may include but is not limited to one or more of a physical keyboard, a function key (such as a volume control key or an on/off key), a trackball, a mouse, a joystick, and the like.

The display device 103 may be configured to display information input by the user or information provided for the user and menus of the terminal 100, including information about a payment application in the embodiments of this application. The display device 103 may include a display panel 1031. Optionally, the display panel 1031 may be configured in a form of a liquid crystal display (Liquid Crystal Display, LCD), an organic light-emitting diode (Organic Light-Emitting Diode, OLED), or the like. Further, the touch panel 1041 may cover the display panel 1031. After detecting a touch operation on or near the touch panel 1041, the touch panel 1041 transfers the touch operation to the processor 101 to determine a type of a touch event. Then the processor 101 provides corresponding visual output on the display panel 1031 based on the type of the touch event. Although the touch panel 1041 and the display panel 1031 in FIG. 1 are used as two independent components to implement input and input functions of the terminal 100, in some embodiments, the touch panel 1041 and the display panel 1031 may be integrated to implement the input and output functions of the terminal 100.

Persons skilled in the art can understand that an internal structure of the terminal 100 shown in FIG. 1 constitutes no limitation on the terminal, and the terminal 100 may include more or fewer components than those shown in the figure, or a combination of some components, or the components disposed differently. For example, the terminal 100 may further include an audio frequency circuit, a loudspeaker, a microphone, and the like that provide an audio interface between a user and the terminal 100. When communicating with an external device in a wireless way, the terminal 100 may further include a radio frequency (Radio Frequency, RF) circuit and a connected antenna, a Wireless Fidelity (Wireless Fidelity, WiFi) module and a connected antenna, and the like. In addition, the terminal 100 further includes a sensor and a power supply that supplies power to the terminal 100, which are not listed one by one herein.

In this embodiment of this application, the processor 101 invokes the program stored in the memory 102 by running the operating system stored in the memory 102, obtains, by using the input instruction obtained by the input device 104, a payment application that is selected by a user and that is to be added to an isolation area, controls the display device 103 to display icons of the payment application and another application, and performs the following function: if determining that the to-be-added payment application has an attribute of being addable to a first isolation area, adding the to-be-added payment application to the first isolation area; or if determining that the to-be-added payment application has an attribute of being addable to a second isolation area, adding the to-be-added payment application to the second isolation area, where a payment application added to the first isolation area has an attribute of being invocable by a trusted application installed outside the first isolation area, and a payment application added to the second isolation area has an attribute of being completely isolated from an application installed outside the second isolation area. This allows a user to use a payment application conveniently while ensuring use safety of the payment application.

The application in this embodiment of this application is an application program installed on a terminal. The payment application is an application program that is installed on a terminal and that is capable of performing financial payment. The trusted application is an application program capable of accessing a payment application in the first isolation area. The application program capable of accessing a payment application in the first isolation area may be set in a predefined manner. A specific predefined manner is not limited. For example, an application program that has been successfully authenticated by an application program that is installed on a terminal and that has a security protection function may be predefined as a trusted application, or an application program that has been installed on a terminal or another application program having a specified function or attribute in an application market may be predefined as a trusted application.

Figure 2A:
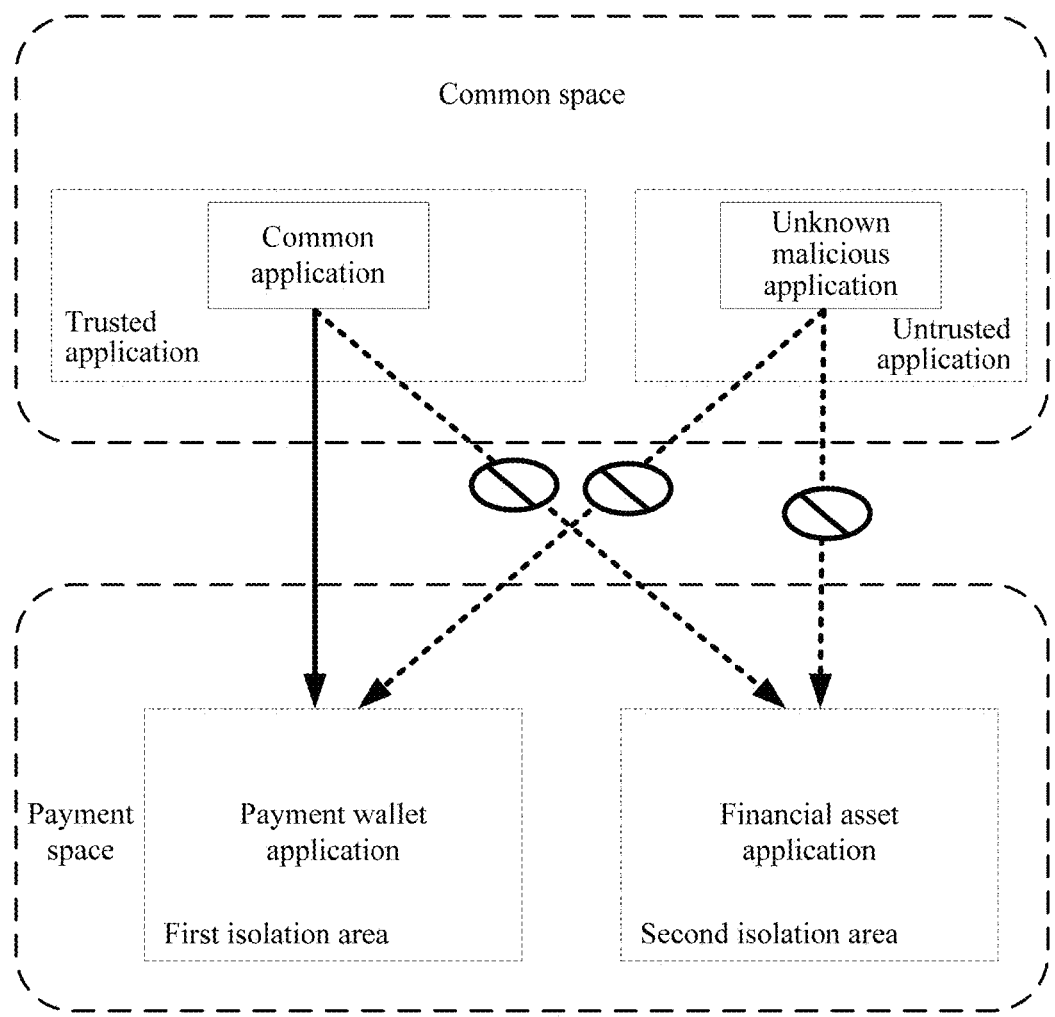
FIG. 2A and FIG. 2B are schematic diagrams of interaction of isolated payment applications according to an embodiment of this application.

The processor of the terminal in this embodiment of this application may divide applications installed on the terminal into a payment application and a common application, install the payment application in a payment space, and install the common application in a common space. The payment space and the common space can be understood as two separate logical units logically divided on the terminal, as shown in FIG. 2A. The payment application in this embodiment of this application is an application program that is installed on the terminal and that is capable of executing financial payment. The common application in this embodiment of this application is a non-payment application installed on the terminal. The payment application installed on the terminal may include a payment wallet application and a financial asset application. In a use scenario of the payment wallet application, the payment wallet application is usually invoked by a common application program to implement payment. For example, Alipay, Taobao, Jingdong Wallet, WeChat, or the like may be considered as a payment wallet application. Relative to the payment wallet application, the financial asset application is usually not invoked by a common application program. For example, bank applications such as an ICBC application, a CMB application, an ABC application, and a BOC application, and applications for securities, wealth management, and the like may be considered as financial asset applications.

Figure 2B:
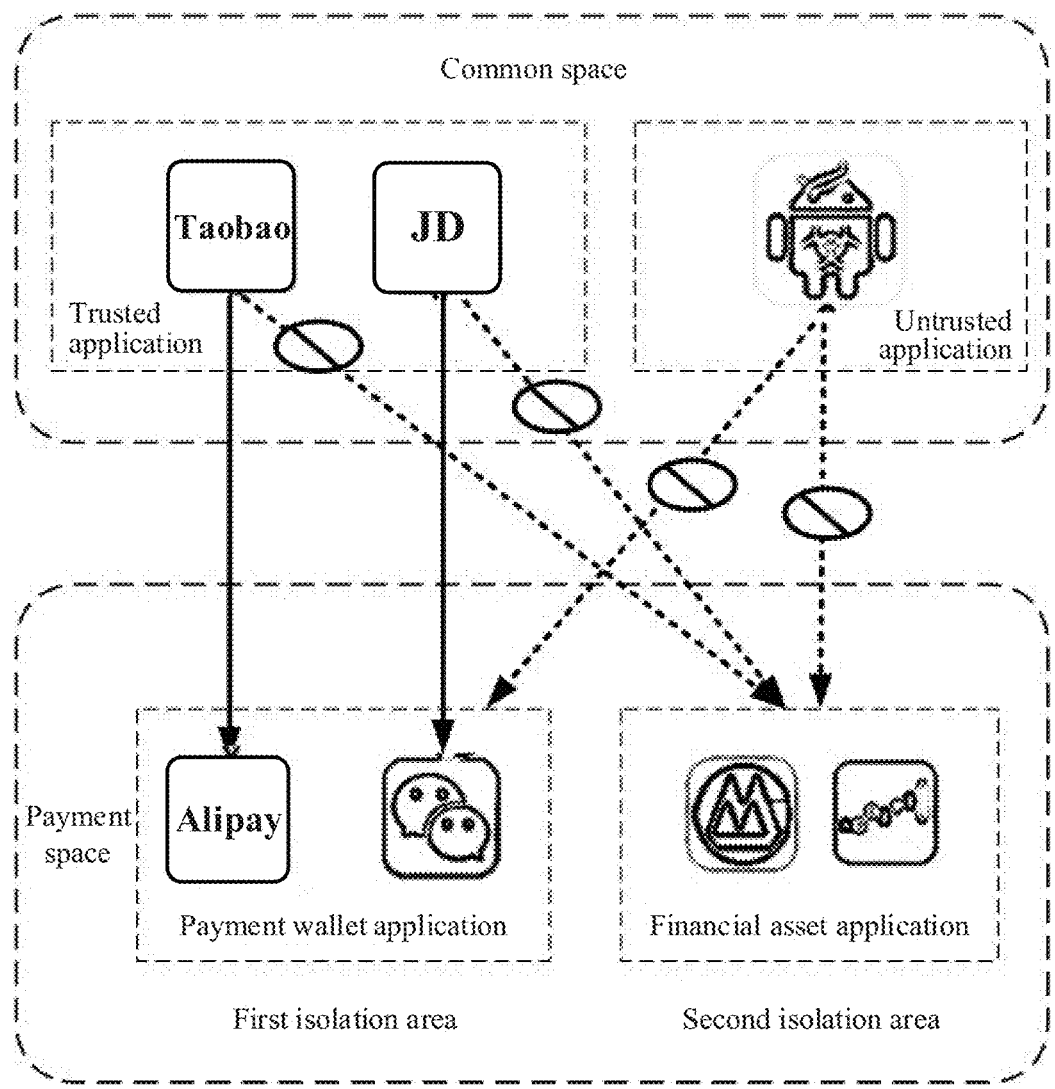

In this embodiment of this application, considering both convenience for use of a payment application by a user and payment application security, the processor of the terminal may set different isolation areas on the terminal. The different isolation areas provide isolation effects of different security levels. A payment application added to an isolation area of a low security level can interact with another application, and a payment application added to an isolation area of a high security level cannot interact with another application. For example, isolation areas that provide isolation protection for payment applications include the first isolation area and the second isolation area. A payment application added to the first isolation area has an attribute of being invocable by a trusted application (for example, a common application) installed outside the first isolation area, and a payment application added to the second isolation area has an attribute of being completely isolated from an application installed outside the second isolation area, and cannot be invoked by any other application. For example, the processor of the terminal in FIG. 2A may add the payment wallet application to the first isolation area, and add the financial asset application to the second isolation area. The payment wallet application in the first isolation area can be invoked and accessed by the trusted application, but cannot be invoked or accessed by an untrusted application (such as an unknown malicious program). The financial asset application added to the second isolation area cannot be invoked or accessed by any application program (the common application and the unknown malicious program). This allows a user to use a payment application conveniently while ensuring payment application security. In this embodiment of this application, the common application and the unknown malicious program may be identified by an application program that is installed on the terminal and that has a security protection function. For example, a mobile guard application installed on the terminal is used to identify the common application and the unknown malicious program. FIG. 2B is an example of description of FIG. 2A. In FIG. 2B, Alipay and WeChat added to the first isolation area can be invoked and accessed by trusted applications added to the common space, such as Taobao and Jingdong. The CMB application and a RoyalFlush application that are added to the second isolation area cannot be invoked or accessed by an application installed outside the second isolation area, for example, an application added to the common space.

Figure 3:
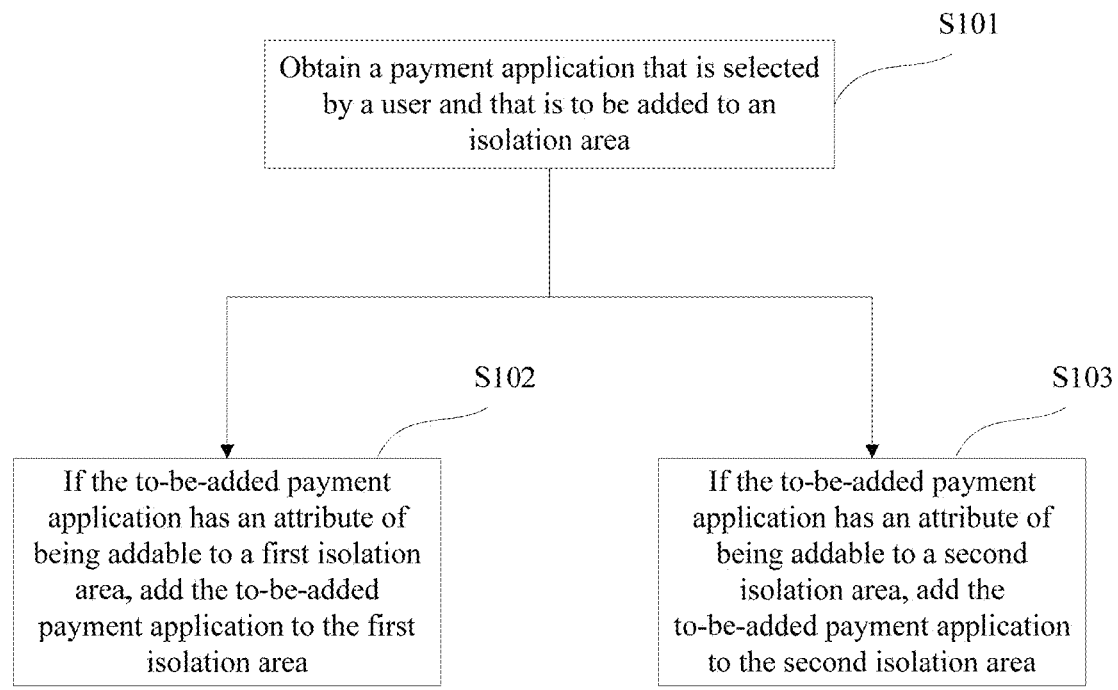
FIG. 3 is a flowchart of implementing a payment application isolation method according to an embodiment of this application.

FIG. 3 is a flowchart of implementing a payment application isolation method according to an embodiment of this application.

S101. Obtain a payment application that is selected by a user and that is to be added to an isolation area.

In this embodiment of this application, the payment application to be added to the isolation area is selected by the user. In an implementation, the payment application to be added to the isolation area is determined and selected by the user. After the user inputs a selection instruction by using a display device of a terminal, the terminal can determine that this application is the payment application to be added to the isolation area. In another implementation, the payment application to be added to the isolation area is determined by a terminal. After the user inputs a selection instruction by using an input device of the terminal, the terminal determines, based on the selection instruction input by the user, whether a payment application selected by the user is the payment application to be added to the isolation area.

In this embodiment of this application, there may be a plurality of implementations in which the user may input, by using the input device of the terminal, a selection instruction of selecting the payment application to be added to the isolation area. For example, the user performs a selection operation through a tap or the like on a touchscreen of the terminal, and after the selection operation is sensed by the touchscreen, the terminal determines the payment application that is selected by the user and that is to be added to the isolation area. A processor of the terminal may obtain, by using the touchscreen, the payment application that is selected by the user and that is to be added to the isolation area.

In this embodiment of this application, the processor of the terminal may predefine payment applications to be added to different isolation areas. For example, the processor of the terminal divides the payment applications into a payment wallet application and a financial asset application, and isolation areas that provide isolation protection for the payment applications include a first isolation area and a second isolation area. A payment application added to the first isolation area can be invoked by a trusted application, and a payment application added to the second isolation area is completely isolated from an application installed outside the second isolation area. For example, the payment application added to the first isolation area is the payment wallet application, and the payment application added to the second isolation area is the financial asset application.

After obtaining the payment application that is selected by the user and that is to be added to the isolation area, the processor of the terminal in this embodiment of this application may add, based on attribute information of the to-be-added payment application, the payment application to the first isolation area or the second isolation area. The attribute information of the to-be-added payment application is mainly attribute information that the payment application is addable to the first isolation area or the second isolation area. The payment application added to the first isolation area has an attribute of being invocable by a trusted application installed outside the first isolation area, and the payment application added to the second isolation area has an attribute of being completely isolated from an application installed outside the second isolation area.

S102. If the to-be-added payment application has an attribute of being addable to a first isolation area, add the to-be-added payment application to the first isolation area.

S103. If the to-be-added payment application has an attribute of being addable to a second isolation area, add the to-be-added payment application to the second isolation area.

With reference to actual application, the following first describes a specific implementation process in which payment applications are added to isolation areas of different security levels according to an embodiment of this application.

Figure 4A:
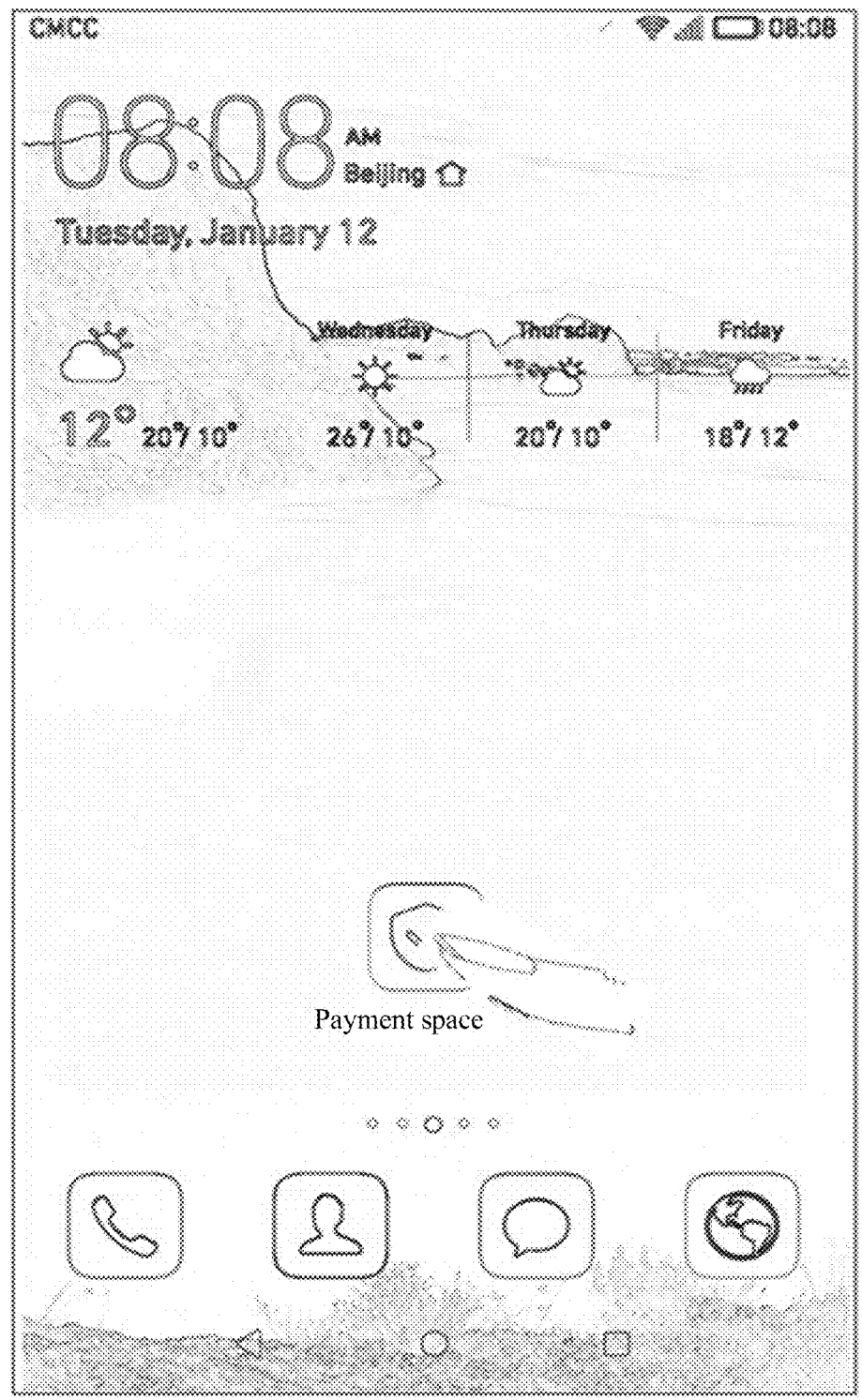
FIG. 4A to FIG. 4E are schematic diagrams of processes of adding payment applications to isolation areas of different security levels according to an embodiment of this application.
Figure 4B:
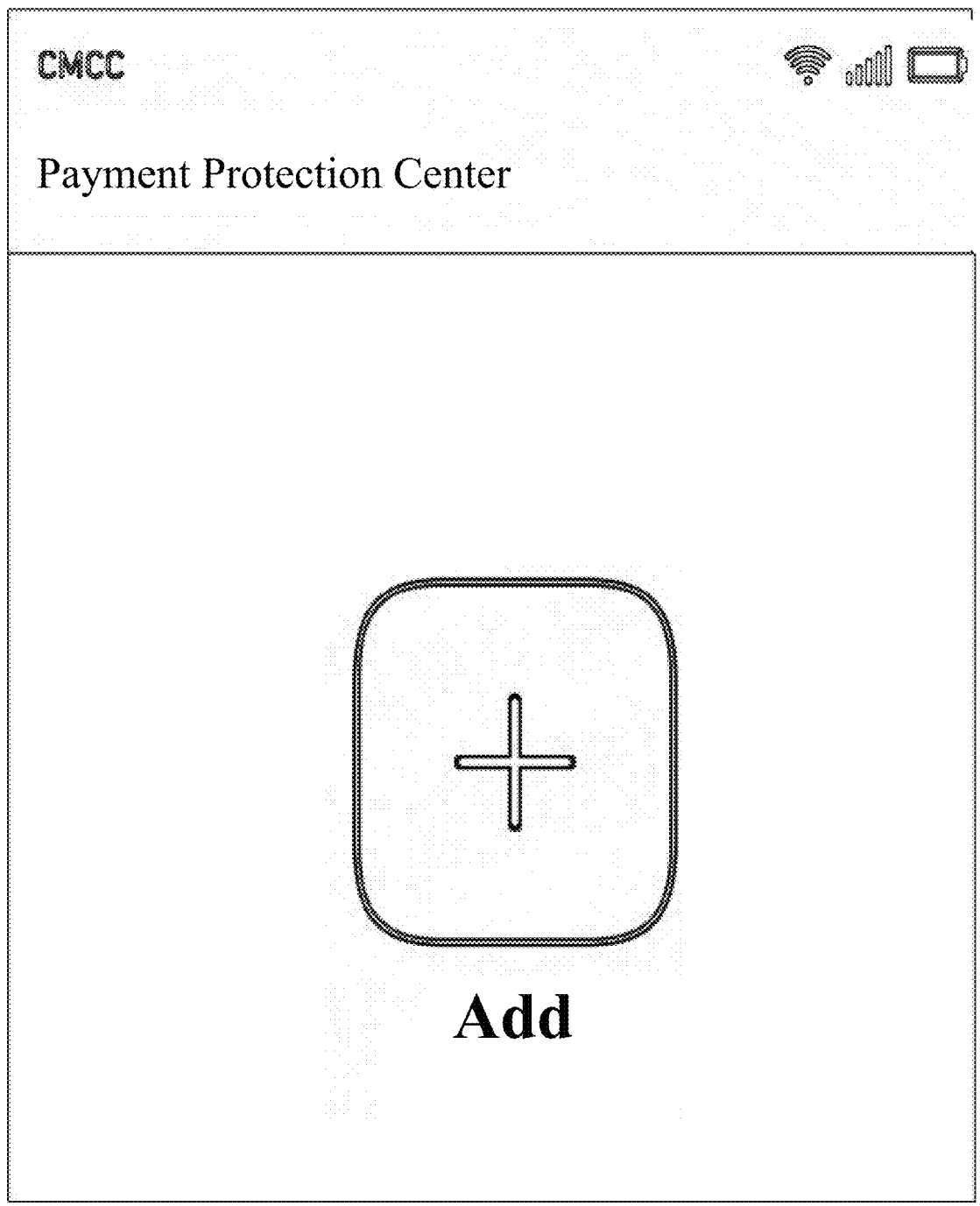
Figure 4C:
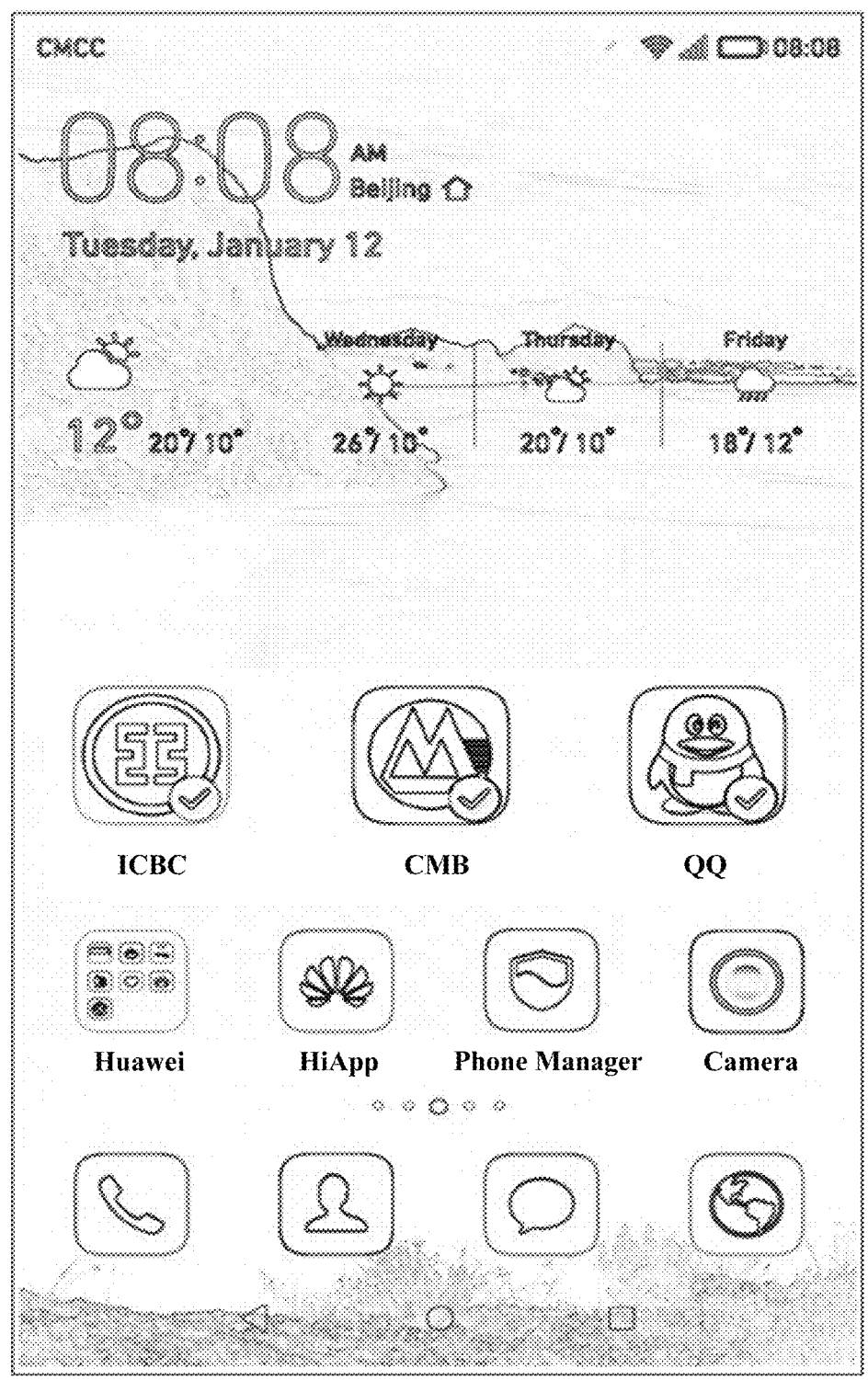

In this embodiment of this application, an application (APP) in a payment space may be installed on the terminal. Isolation areas of different security levels are set in the payment space. An application icon of the payment space is displayed in a display interface of the terminal. The user selects the application icon of the payment space by performing an operation such as tapping in the display interface of the terminal, to start and enter the payment space. For example, in FIG. 4A, after selecting the application icon of the payment space in the display interface of the terminal, the user can enter the payment space named payment protection center shown in FIG. 4B. In this embodiment of this application, the payment space named payment protection center is used as an example for description. Certainly, a specific name is not limited. The payment protection center in this embodiment of this application may be understood as the payment space. An icon used to prompt the user to add the payment application to the payment protection center may be displayed in the payment space shown in FIG. 4B. After selecting the add icon, the user may select the payment application to be added to the payment protection center. In a possible implementation, the user may choose to add, to the payment protection center, a payment application installed locally on the terminal. For example, in FIG. 4C, the user chooses to add, to the payment protection center, a local payment application that has succeeded in security detection. In FIG. 4C, "√" is displayed on a display icon of a payment application that is selected by the user and that is to be added to the payment protection center. In another possible implementation, in this embodiment of this application, the user may choose to download a genuine payment application in a payment zone and add the genuine payment application to the payment protection center. The payment zone may be understood as an application store that provides payment applications to be added to the first isolation area and the second isolation area.

Figure 4D:
Figure 4E:
Figure 4E:
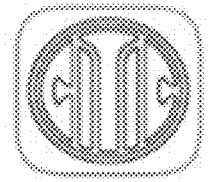
Figure 4E:
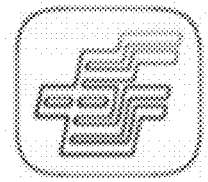
Figure 4E:
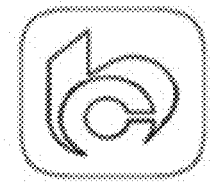
Figure 4E:
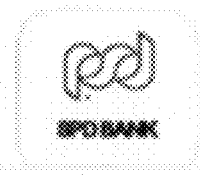

In a possible implementation, the processor of the terminal in this embodiment of this application may pre-create a payment zone. The pre-created payment zone includes payment applications to be added to the first isolation area and the second isolation area. The payment applications to be added to the first isolation area and the second isolation area can be downloaded and obtained from the payment zone. The payment zone may be created by using a cloud, and an ingress link for accessing the payment zone is provided in the payment space. For example, an application program with an icon name "Add more genuine applications" displayed in FIG. 4D may be considered as the ingress link that provides access to the payment zone. After the user starts the payment space in a manner in the foregoing embodiment, the user may tap the ingress link to access the payment zone, as shown in FIG. 4E. In this embodiment of this application, the payment applications displayed in the payment zone shown in FIG. 4E are merely used as an example for description. Not all payment applications that are to be added to the first isolation area and the second isolation area are displayed in the payment zone. By using "Search for a genuine application" displayed in the payment zone, the user may search for another payment application that is not displayed. The user selects, in the payment zone, a payment application that needs to be added to the first isolation area or the second isolation area.

In this embodiment of this application, after the user selects an application to be added to an isolation area, the processor of the terminal may directly add the to-be-added payment application to the first isolation area or the second isolation area.

In this embodiment of this application, the payment application in the payment zone has attribute information of being addable to the first isolation area or the second isolation area. The user may directly add, to the first isolation area or the second isolation area, the payment application downloaded and obtained in the payment zone.

It should be noted that, in this embodiment of this application, the payment application to be added to the isolation area does not necessarily come from the payment zone. For example, the payment application may be a payment application that has been installed before the isolation area is created on the terminal. After the isolation area is created on the terminal, prompt information may be displayed on a display device, to ask the user whether to add the installed payment application to the created isolation area. In a possible implementation of this embodiment of this application, a payment application, added by the user to an isolation area, in a non-payment zone may be the same as a payment application in the payment zone. To be specific, after obtaining, by using the input device, the payment application that is selected by the user and that is to be added to the isolation area, the processor of the terminal needs to determine that in the payment zone, there is a payment application that is the same as the to-be-added payment application, so that the processor of the terminal can determine, when adding the payment application to the isolation area, whether the payment application has attribute information of being addable to the first isolation area or the second isolation area.

It should be noted that, in this embodiment of the present invention, that payment applications are the same means that the payment applications have a same principal function, but are not limited to having same attribute information such as version information. For example, same payment applications of different versions may be understood as same payment applications.

In this embodiment of this application, no limitation is imposed on a specific implementation process of determining, by the processor of the terminal, whether the payment application has the attribute information of being addable to the first isolation area or the second isolation area. For example, in a possible implementation, a predefined manner may be used to pre-add a first label to the payment application to be added to the first isolation area, and pre-add a second label to the payment application to be added to the second isolation area. After obtaining the to-be-added payment application by using the input device, the processor of the terminal may determine, through parsing, whether a label of the to-be-added payment application is the first label or the second label, so as to add the to-be-added payment application to the first isolation area or the second isolation area. If the label of the to-be-added payment application is the first label, the to-be-added payment application is added to the first isolation area. If the label of the to-be-added payment application is the second label, the to-be-added payment application is added to the second isolation area. In another possible implementation, a manner such as semantic analysis may be used to determine attribute information of the to-be-added payment application. For example, if it is determined, through semantic analysis, that the to-be-added payment application has a payment function and has a communications interface to be invoked by another application, it may be considered that the to-be-added payment application needs to interact with the another application frequently; therefore, the to-be-added payment application may be added to the first isolation area. If it is determined, through semantic analysis, that the to-be-added payment application has only a payment function, it may be considered that the to-be-added payment application does not need to interact with another application frequently; therefore, the to-be-added payment application may be added to the second isolation area.

A process of performing security protection on payment applications after the payment applications are added to the first isolation area and the second isolation area is described in this embodiment of this application.

In a possible implementation of this embodiment of this application, a multi-terminal-user creation manner may be used to create the first isolation area and the second isolation area in different terminal users. For example, the first isolation area is installed in a primary terminal user, the second isolation area is installed in a subordinate terminal user, and the subordinate terminal user in which the second isolation area is installed is set as a hidden user, to further improve security. The hidden user means a subordinate terminal user not displayed in a display interface of the primary terminal user. For example, the hidden user may be understood as a user that is created in a terminal and that is not presented by the terminal to a guest in a guest mode.

In this embodiment of this application, the subordinate terminal user to which the second isolation area belongs may be created when a payment space is started for the first time, so as to provide isolation protection for the payment application in the second isolation area. The subordinate terminal user to which the second isolation area belongs may be created by using service systems such as a package manager service (Package manager service, PMS), a user manager service (user manager service, UMS), and an activity manager service (activity manager service, AMS). The PMS is responsible for managing, adding, and deleting the payment application installed in the subordinate terminal user, and provides functions for the payment space, and an operating system, a launcher (Launcher), and the like of the terminal. The UMS and the AMS are responsible for creating, deleting, starting, and stopping the subordinate terminal user, and are also invoked by the payment space and an application layer module such as the operating system or the launcher (Launcher) of the terminal. For a specific implementation process of creating the subordinate terminal user by using the PMS, the UMS, and the AMS, refer to an existing general creation technology, and details are not described herein in this embodiment of this application.

In this embodiment of this application, the subordinate terminal user to which the second isolation area belongs is a hidden user, a payment application added to the hidden user runs in an independent user space and cannot be discovered or invoked by an application program of the primary terminal user, and data is separated from data of an application program that runs in the primary terminal user. In this way, the payment application in the second isolation area is in a complete isolation state, and security is improved.

In a possible implementation, an unnecessary process of the subordinate terminal user may be deleted in this embodiment of this application. The unnecessary process is deleted, so as to reduce resource and memory consumption while ensuring security. The unnecessary process is a process other than a core process of a system. The core process is a minimum set of system processes that maintain system running, including a task scheduler, a memory manager, an inter-process communication manager, a data manager, a file system, and the like. For example, after the unnecessary process is deleted, the subordinate terminal user includes only 20+ processes such as Theme and Chrome, so that resource occupation is reduced to 20 M from 80 M.

Figure 5:
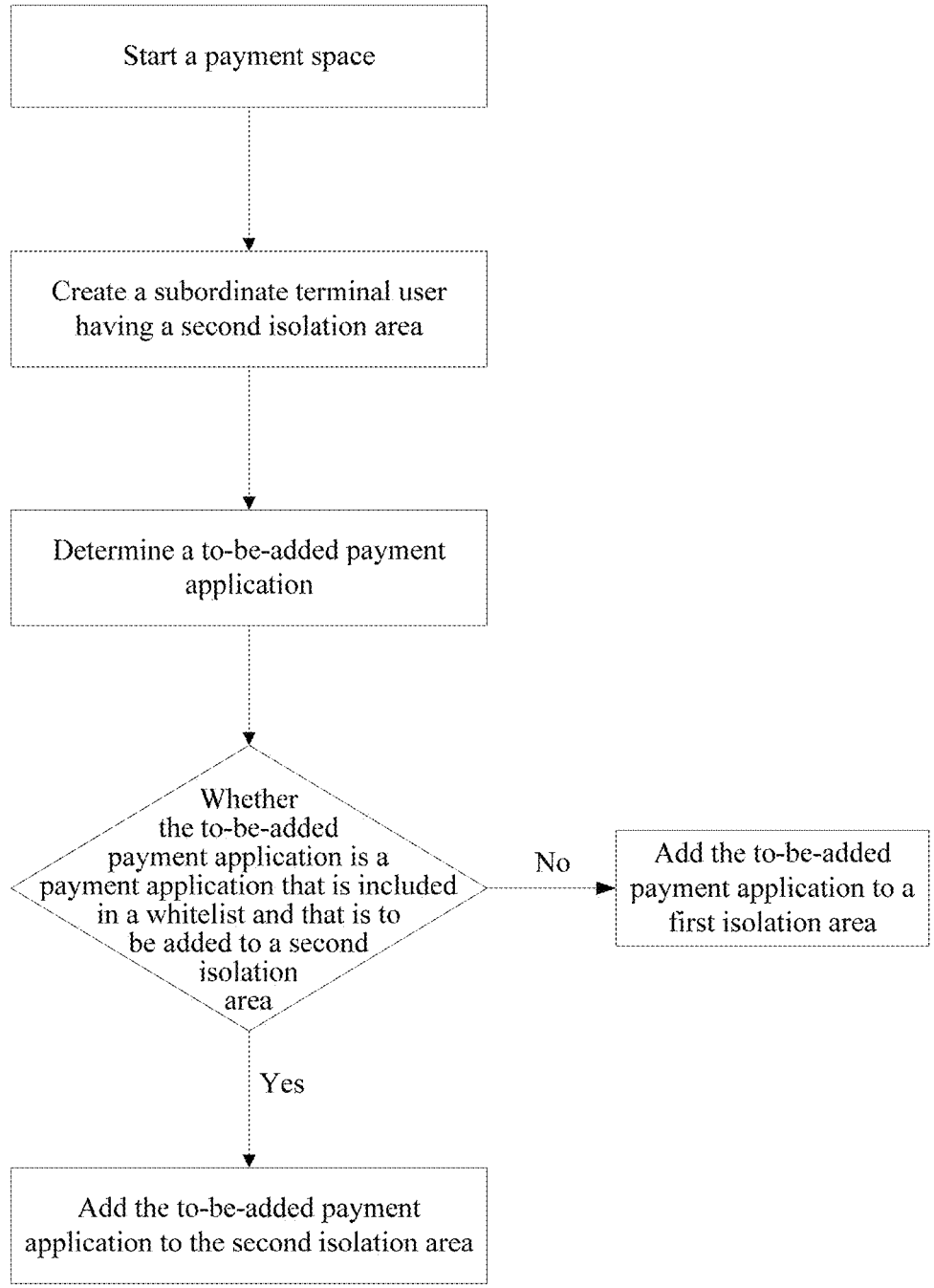
FIG. 5 is a schematic flowchart of adding a payment application according to an embodiment of this application.

In this embodiment of this application, after the subordinate terminal user for the second isolation area is created, payment applications may be added to the first isolation area and the second isolation area by using, for example, a whitelist. For example, as shown in FIG. 5, when the whitelist includes the payment application to be added to the second isolation area, the processor of the terminal determines, after the user selects a to-be-added payment application (the processor of the terminal determines the to-be-added application), whether the to-be-added payment application is a payment application that is to be added to the second isolation area and that is included in the whitelist. If the to-be-added payment application is a payment application that is included in the whitelist and that is to be added to the second isolation area, the to-be-added payment application is added to the second isolation area. If the to-be-added payment application is not a payment application that is included in the whitelist and that is to be added to the second isolation area, the to-be-added payment application is added to the first isolation area. Certainly, the whitelist may also include the payment application to be added to the first isolation area. A specific implementation process is similar to an implementation process in which the whitelist includes the payment application to be added to the second isolation area, and details are not repeated herein.

In a possible implementation, the processor of the terminal in this embodiment of this application may use an Intent Firewall (a firewall for inter-process communication in an operating system, where the operating system may be an Android operating system) to perform isolation protection on the payment application added to the first isolation area. In this embodiment of this application, four components of the Intent Firewall, that is, an activity (Activity) component, a service (Service) component, a broadcast (Broadcast) component, and a content provider (Content Provider) component, may be used to manage, control, and block an application program that invokes the payment application in the first isolation area, so that only a trusted application that satisfies an invoking policy is allowed to invoke the payment application in the first isolation area. For specific processes of implementing management, control, and blocking by the activity component, the service component, the broadcast component, and the content provider component of the Intent Firewall of the application, refer to a currently universal blocking technology, and details are not described herein in this embodiment of this application. When it is detected that an unknown malicious program is accessing the payment application added to the first isolation area, access performed by the unknown malicious program is blocked, and prompt information is displayed, where the prompt information is used to inform that there is an unknown malicious program.

In this embodiment of this application, if the primary terminal user and the subordinate terminal user are created in the terminal, the subordinate terminal user is a hidden user of the primary terminal user. If a to-be-added payment application has an attribute of being addable to the first isolation area, the processor of the terminal may add, to the primary terminal user, the payment application to be added to the first isolation area. If a to-be-added payment application has an attribute of being addable to the second isolation area, the processor of the terminal may add, to the subordinate terminal user, the payment application to be added to the second isolation area.

In a multi-terminal-user creation manner, after the first isolation area and the second isolation area are created in different terminal users, and payment applications are added to the first isolation area and the second isolation area. Because the first isolation area belongs to a primary terminal user, a payment application added to the first isolation area is normally displayed in a display interface of the primary terminal user displayed on a display device of the terminal. Because the second isolation area belongs to a subordinate terminal user and the subordinate terminal user is a hidden user, a payment application added to the second isolation area is not displayed in the display interface of the primary terminal user displayed on the display device of the terminal.

Figure 6:
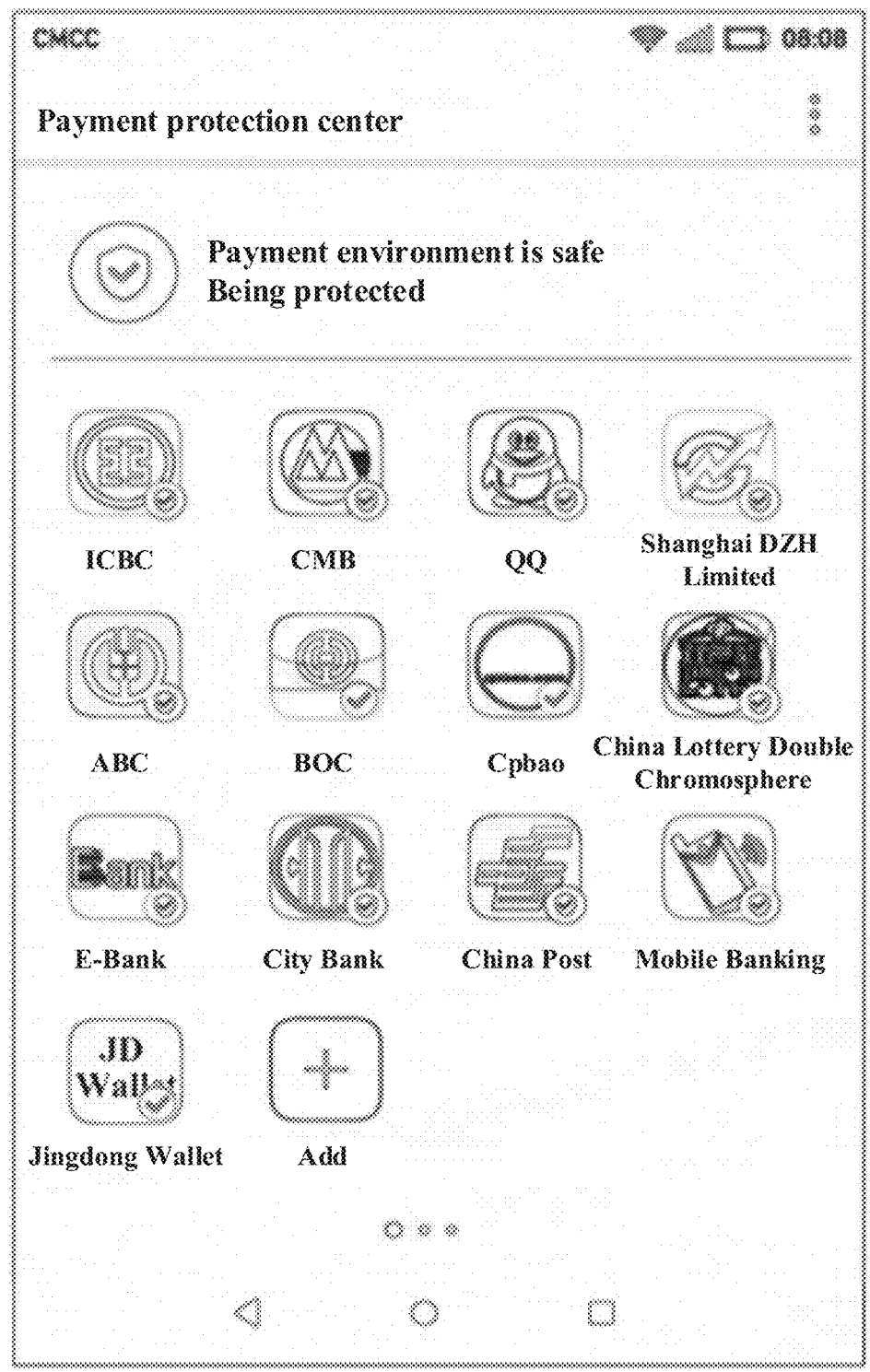
FIG. 6 is a schematic diagram of displaying a payment application in a primary terminal user according to an embodiment of this application.

Optionally, in this embodiment of this application, the payment application added to the first isolation area may be displayed in the display interface of the primary terminal user in a display manner different from that of a common application. For example, a mark is added to an application icon of the payment application that is added to the first isolation area and that is displayed in the display interface of the primary terminal user, or an application icon of the payment application added to the first isolation area is displayed in a different grayscale. For example, in FIG. 6, a mark is added to a display icon of a payment application added to the primary terminal user, so that a user can learn that the payment application is added to the isolation area.

In this embodiment of this application, payment applications of different isolation types are added to the first isolation area and the second isolation area that are of different security levels, a payment application added to the first isolation area can be invoked by a trusted application, and a payment application added to the second isolation area is completely isolated from an application installed outside the second isolation area. This allows a user to use a payment application conveniently while ensuring payment application security.

Figure 7:
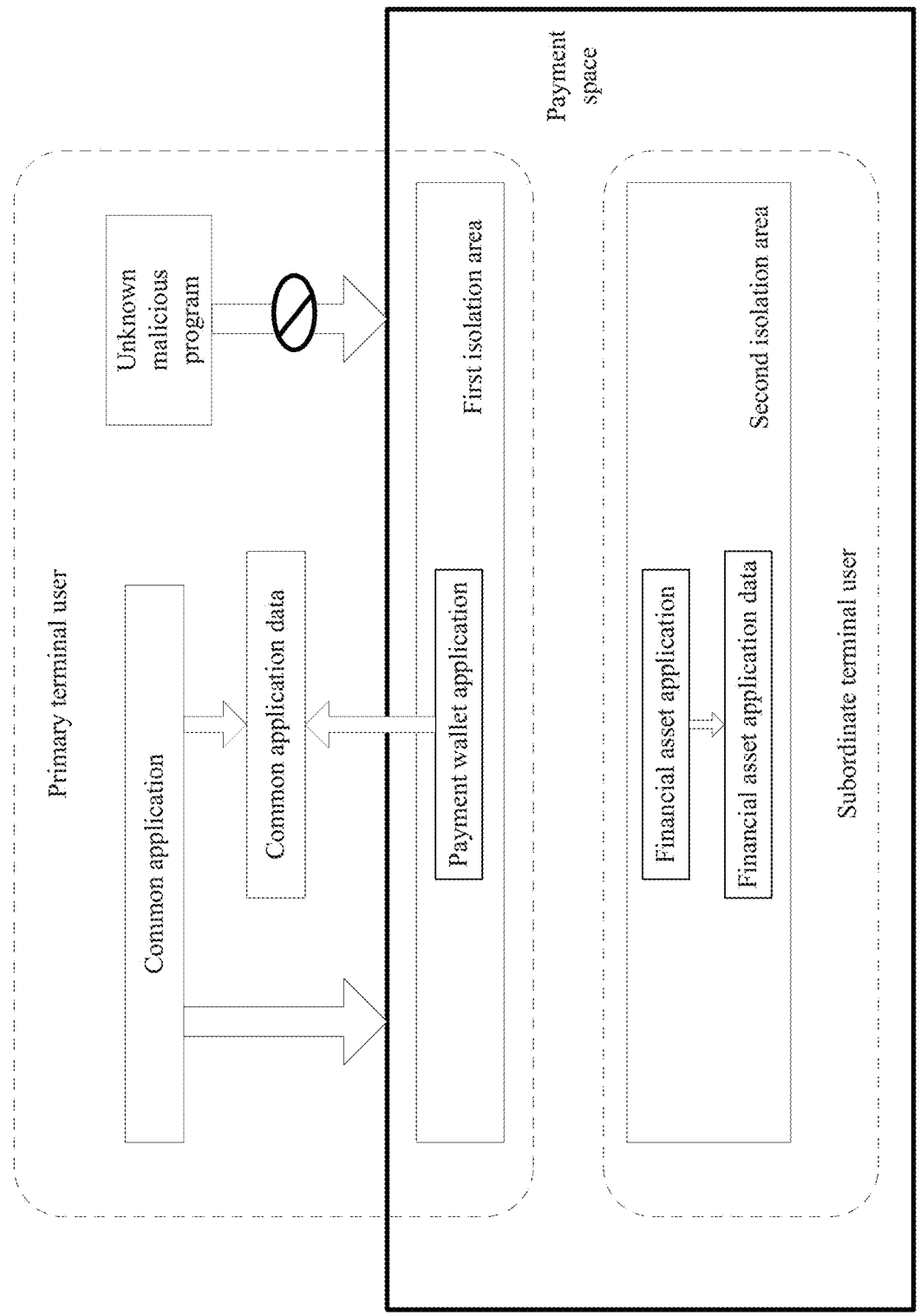
FIG. 7 is another schematic diagram of interaction of isolated payment applications according to an embodiment of this application.

According to the payment application isolation method provided in this embodiment of this application, the payment application added to the first isolation area in the payment space can be invoked by the trusted application, and the payment application added to the first isolation area in the payment space can interact with the common application of the primary terminal user and can access data of the common application. For example, as shown in FIG. 7, after the payment wallet application is added to the first isolation area created in the primary terminal user, the payment wallet application manages, controls, and blocks the unknown malicious program based on the activity component, the service component, the broadcast component, and the content provider component of the Intent Firewall. The unknown malicious program cannot access the payment wallet application, but the payment wallet application can be invoked by the common application in the primary terminal user, and the payment wallet application can interact with a common user in the primary terminal user and can access data of the common application. The payment application added to the second isolation area in the payment space is completely isolated from and cannot interact with any application installed outside the second isolation area. For example, the payment application in the second isolation area can access only data of a corresponding payment application in the second isolation area. For example, in FIG. 7, after a financial asset application is added to the second isolation area created in the subordinate terminal user, the financial asset application does not exchange data with the payment wallet application in the first isolation area, the common application in the primary terminal user, the unknown malicious program, and the like. The financial asset application can access only data of a corresponding payment application in the second isolation area.

It should be noted that in this embodiment of this application, in FIG. 7, the financial asset application added to the second isolation area created in the subordinate terminal user is described by using an example in which the subordinate terminal user is displayed in the payment space. In actual application, to further improve security, the subordinate terminal user may be a hidden user, and is not displayed in the display interface of the display device of the terminal.

In this embodiment of this application, if the user needs to access the payment application in the second isolation area created in the subordinate terminal user, the user needs to log in to the subordinate terminal user in a manner such as account verification, access the payment space and the second isolation area, select a to-be-accessed payment application, and access the payment application.

It can be understood that, to perform the foregoing functions, the terminal includes corresponding hardware structures and/or software modules for performing the functions. Units and algorithm steps of the examples described in combination with this embodiment disclosed in this application may be implemented by hardware or a combination of hardware and computer software in this embodiment of this application. Whether a function is performed by hardware or by computer software driving hardware depends on a particular application and a design constraint condition of the technical solution. For each particular application, persons skilled in the art may use different methods to implement the described functions, but it should not be considered that the implementation goes beyond the scope of the technical solution of this embodiment of this application.

In this embodiment of this application, functional unit division may be performed on the terminal based on the example of the method. For example, functional units may be divided based on corresponding functions, or two or more than two functions may be integrated into one processing unit. The integrated unit may be implemented in a form of hardware, or may be implemented in a form of a software functional unit. It should be noted that the unit division in this embodiment of this application is an example, and is merely logical function division, or may be other division in actual implementation.

Figure 8:
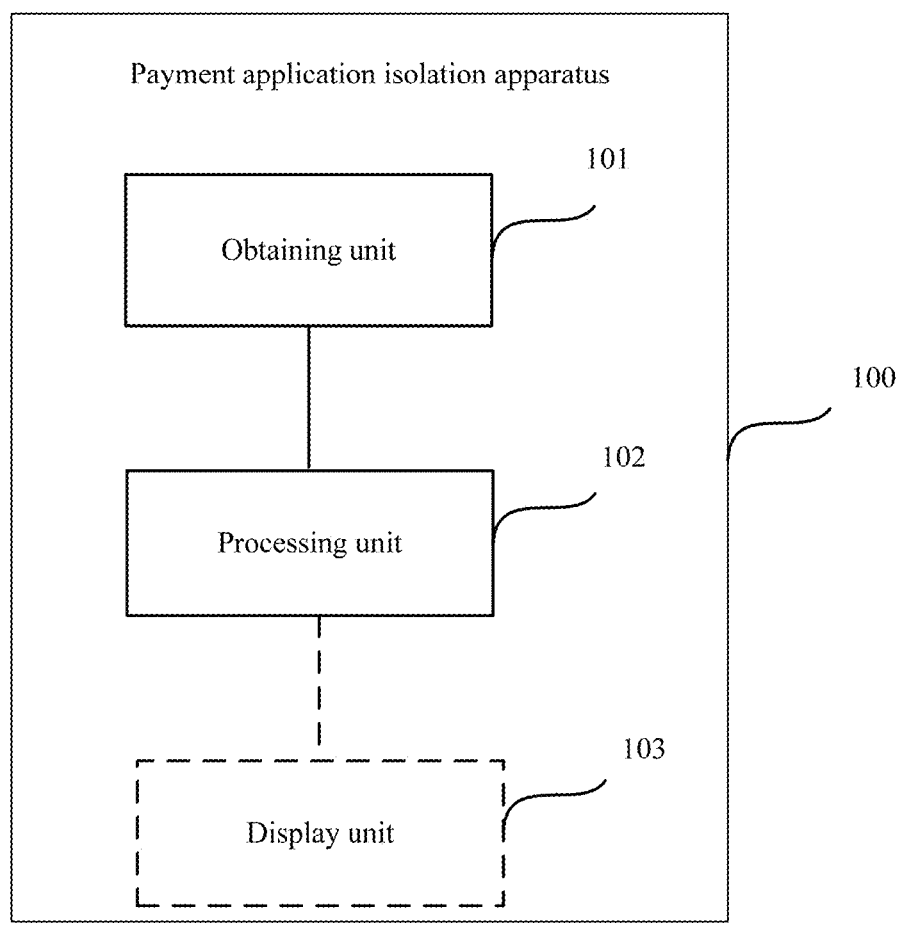
FIG. 8 is a schematic structural diagram of a payment application isolation apparatus according to an embodiment of this application.

FIG. 8 is a schematic structural diagram of a payment application isolation apparatus according to an embodiment of this application when an integrated unit is used. As shown in FIG. 8, the payment application isolation apparatus 100 includes an obtaining unit 101 and a processing unit 102. The obtaining unit 101 is configured to obtain a payment application that is selected by a user and that is to be added to an isolation area.

The processing unit 102 is configured to: if determining that the to-be-added payment application obtained by the obtaining unit 101 has an attribute of being addable to a first isolation area, add the to-be-added payment application to the first isolation area; or if determining that the to-be-added payment application obtained by the obtaining unit 101 has an attribute of being addable to a second isolation area, add the to-be-added payment application to the second isolation area.

A payment application added to the first isolation area has an attribute of being invocable by a trusted application installed outside the first isolation area, and a payment application added to the second isolation area has an attribute of being completely isolated from an application installed outside the second isolation area.

A primary terminal user and a subordinate terminal user are created in a terminal, and the subordinate terminal user is a hidden user of the primary terminal user. The processing unit 102 may add the to-be-added payment application to the subordinate terminal user, where the second isolation area belongs to the subordinate terminal user. This further improves security of the payment application in the second isolation area.

The processing unit 102 is further configured to: after adding the to-be-added payment application to the subordinate terminal user to which the second isolation area belongs, delete an unnecessary process of the subordinate terminal user, so as to reduce resource and memory consumption while ensuring security.

The primary terminal user and the subordinate terminal user are created in the terminal, and the subordinate terminal user is a hidden user of the primary terminal user. The processing unit 102 may add the to-be-added payment application to the primary terminal user, where the first isolation area belongs to the primary terminal user. A display unit 103 included in the terminal is configured to: after the processing unit 102 adds the to-be-added payment application to the primary terminal user, display, in a display interface of the primary terminal user in a display manner different from that of a common application, the payment application added to the first isolation area.

The processing unit 102 is further configured to: after adding the to-be-added payment application to the first isolation area, if it is detected that an unknown malicious program is accessing the payment application added to the first isolation area, block access performed by the unknown malicious program. The display unit 103 included in the apparatus is configured to display prompt information, where the prompt information is used to inform that there is an unknown malicious program.

The payment applications added to the first isolation area and the second isolation area are payment applications pre-created in a payment zone. The obtaining unit 101 is further configured to: after obtaining the payment application that is selected by the user and that is to be added to the isolation area, determine that a payment application that is the same as the to-be-added payment application exists in the payment zone, so as to determine an isolation type of the payment application added to the isolation area.

The payment application isolation apparatus 100 provided in this embodiment of this application has all functions in the process of implementing the payment application isolation method in the foregoing method embodiment. For a specific implementation process, refer to the foregoing embodiment and related descriptions of the accompanying drawings, and details are not repeated herein.

It should be noted that, in this embodiment of this application, the accompanying drawings are merely examples for description, and a form of the terminal in an actual implementation process is not limited. For example, FIG. 4A to FIG. 4E and FIG. 6 are merely used as examples to describe the payment application displayed in the display interface of the terminal, and components such as a housing of the terminal are omitted. In an actual implementation process, the display screen is displayed on a physical structure such as the housing of the terminal, and no limitation is imposed on specific content and an application name that are displayed in the display interface of the terminal.

Persons of ordinary skill in the art may understand that all or some of the steps in the method of the foregoing embodiment may be implemented by a program instructing a processor. The program may be stored in a computer readable storage medium. The storage medium may be a non-transitory (English: non-transitory) medium, such as a random-access memory, a read-only memory, a flash memory, a hard disk, a solid-state drive, a magnetic tape (English: magnetic tape), a floppy disk (English: floppy disk), an optical disc (English: optical disc), or any combination thereof.

What is claimed is:

1. A payment application isolation method, wherein the method is applied to a terminal and comprises:
   obtaining a to-be-added payment application selected by a user, wherein the to-be-added payment application is to be added to an isolation area;
   adding the to-be-added payment application to a first isolation area when the to-be-added payment application is determined to have the attribute of being addable to the first isolation area, wherein a payment application added to the first isolation area is invocable by a trusted application installed outside the first isolation area; and
   adding the to-be-added payment application to a second isolation area when the to-be-added payment application is determined to have the attribute of being addable to the second isolation area, wherein a payment application added to the second isolation area is completely isolated from an application installed outside the second isolation area.

2. The method according to claim 1, further comprising creating a primary terminal user account and a subordinate terminal user account in the terminal, wherein the subordinate terminal user account is a hidden user account of the primary terminal user account, wherein adding the to-be-added payment application to the second isolation area comprises adding the to-be-added payment application to the subordinate terminal user account, and wherein the second isolation area belongs to the subordinate terminal user account.

3. The method according to claim 2, wherein after adding the to-be-added payment application to the subordinate terminal user account, the method further comprises deleting a non-core process of the subordinate terminal user account.

4. The method according to claim 1, further comprising creating a primary terminal user account and a subordinate terminal user account in the terminal, wherein adding the to-be-added payment application to the first isolation area comprises adding the to-be-added payment application to the primary terminal user account, wherein the first isolation area belongs to the primary terminal user account, and wherein after the adding the to-be-added payment application to the primary terminal user account, the method further comprises displaying, in a display interface of the primary terminal user account in a display manner different from that of an application common to the primary user account and the subordinate user account, the to-be-added payment application added to the first isolation area.

5. The method according to claim 1, wherein after adding the to-be-added payment application to the first isolation area, the method further comprises:
   blocking, when detecting that an unknown malicious program is accessing the to-be-added payment application added to the first isolation area, access performed by the unknown malicious program; and
   displaying prompt information, wherein the prompt information informs of the unknown malicious program.

6. The method according to claim 1, further comprising:
   pre-creating a to-be-added payment application to be added to either a payment zone of the first isolation area or a payment zone of the second isolation area,
   wherein after obtaining the to-be-added payment application selected by the user and to be added to an isolation area, the method further comprises determining that the selected to-be-added payment application is the same as the pre-created to-be-added payment application.

7. The method according to claim 1, wherein the to-be-added payment application is a payment wallet application when added to the first isolation area, and wherein the to-be-added payment application is a financial asset application when added to the second isolation area.

8. A terminal, comprising:
a processor;
a memory configured to store program code executed by the processor;
a display device;
an input device configured to obtain an input instruction for selecting a to-be-added payment application by a user; and
a bus coupling the processor to the input device, the display device, and the memory, wherein the processor invokes the program code stored in the memory and is configured to:
  obtain, by using the input instruction obtained by the input device, the to-be-added payment application selected by the user, wherein the to-be-added payment application is to be added to an isolation area;
  add the to-be-added payment application to a first isolation area when the to-be-added payment application is determined to have the attribute of being addable to the first isolation area, wherein a payment application added to the first isolation area is invocable by a trusted application installed outside the first isolation area;
  add the to-be-added payment application to a second isolation area when the to-be-added payment application is determined to have the attribute of being addable to the second isolation area, wherein a payment application added to the second isolation area is completely isolated from an application installed outside the second isolation area, and
wherein the display device is configured to display an application icon of the to-be-added payment application under control of the processor.

9. The terminal according to claim 8, wherein the processor is further configured to create a primary terminal user account and a subordinate terminal user account in the terminal, wherein the subordinate terminal user account is a hidden user account of the primary terminal user account, wherein the processor adds the to-be-added payment application to the second isolation area by adding the to-be-added payment application to the subordinate terminal user account, and wherein the second isolation area belongs to the subordinate terminal user account.

10. The terminal according to claim 9, wherein the processor is further configured to delete, after adding the to-be-added payment application to the subordinate terminal user account, a non-core process of the subordinate terminal user account.

11. The terminal according to claim 9, wherein after adding the to-be-added payment application to the first isolation area, the processor is further configured to block, when detecting that an unknown malicious program is accessing the to-be-added payment application added to the first isolation area, access performed by the unknown malicious program, wherein the display device is further configured to display prompt information, and wherein the prompt information informs of the unknown malicious program.

12. The terminal according to claim 9, further comprising:
pre-creating a payment application added to either a payment zone of the first isolation area or a payment zone of the second isolation area, and
wherein the processor is further configured to, after obtaining, by using the input device, the to-be-added payment application selected by the user and to be added to the isolation area, determine that the selected to-be-added payment application is the same as the pre-created to-be-added payment application.

13. The terminal according to claim 9, wherein the to-be-added payment application is a payment wallet application when added to the first isolation area, and wherein the to-be-added payment application is a financial asset application when added to the second isolation area.

14. The terminal according to claim 8, wherein the processor is further configured to create a primary terminal user account and a subordinate terminal user account in the terminal, wherein the subordinate terminal user account is a hidden user account of the primary terminal user account, wherein the processor adds the to-be-added payment application to the first isolation area by adding the to-be-added payment application to the primary terminal user account, wherein the first isolation area belongs to the primary terminal user account, and wherein the processor is further configured to control the display device to display, in a display interface of the primary terminal user account in a display manner different from that of an application common to the primary user account and the subordinate user account, the payment application added to the first isolation area after adding the to-be-added payment application to the primary terminal user account.

15. A computer program product comprising computer-executable instructions stored on a non-transitory computer-readable medium that, when executed by a processor, cause an apparatus to:
obtain, by using an input instruction obtained by an input device, a to-be-added payment application selected by a user and to be added to an isolation area;
add the to-be-added payment application to a first isolation area when the to-be-added payment application is determined to have the attribute of being addable to the first isolation area, wherein a payment application added to the first isolation area is invocable by a trusted application installed outside the first isolation area;
add the to-be-added payment application to a second isolation area when the to-be-added payment application is determined to have the attribute of being addable to the second isolation area, wherein a payment application added to the second isolation area is completely isolated from an application installed outside the second isolation area; and
display an application icon of the to-be-added payment application on a display device.

16. The computer program product of claim 15, wherein the instructions further cause the apparatus to create a primary terminal user account and a subordinate terminal user account in the computer program product, wherein the subordinate terminal user account is a hidden user account of the primary terminal user account, wherein the processor adds the to-be-added payment application to the second isolation area by adding the to-be-added payment application to the subordinate terminal user account, and wherein the second isolation area belongs to the subordinate terminal user account.

17. The computer program product of claim 16, wherein the instructions further cause the apparatus to delete, after adding the to-be-added payment application to the subordinate terminal user account, a non-core process of the subordinate terminal user account.

18. The computer program product of claim 16, wherein after adding the to-be-added payment application to the first isolation area, the instructions further cause the apparatus to block, when detecting that an unknown malicious program is accessing the to-be-added payment application added to the first isolation area, access performed by the unknown malicious program, wherein the display device is further configured to display prompt information, and wherein the prompt information informs of the unknown malicious program.

19. The computer program product of claim 16, wherein the instructions further cause the apparatus to:
   pre-create a to-be-added payment application to be added to either a payment zone of the first isolation area or a payment zone of the second isolation area, and
   determine, after obtaining the to-be-added payment application selected by the user and to be added to the isolation area, that the selected to-be-added payment application is the same as the pre-created to-be-added payment application.

20. The computer program product of claim 15, wherein the instructions further cause the apparatus to create a primary terminal user account and a subordinate terminal user account in the computer program product, wherein the subordinate terminal user account is a hidden user account of the primary terminal user account, wherein the processor adds the to-be-added payment application to the first isolation area by adding the to-be-added payment application to the primary terminal user account, wherein the first isolation area belongs to the primary terminal user account, and wherein the processor is further configured to control the display device to display, in a display interface of the primary terminal user account in a display manner different from that of an application common to the primary user account and the subordinate user account, the payment application added to the first isolation area after adding the to-be-added payment application to the primary terminal user account.

* * * * *